March 24, 1964
W. G. WISE
3,126,198
HEATING DEVICE
Filed March 3, 1961
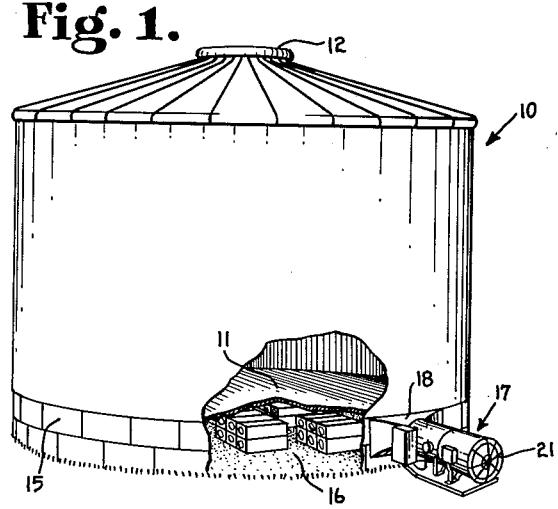
Fig. 1.
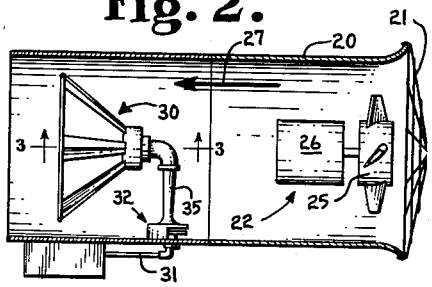
Fig. 2.
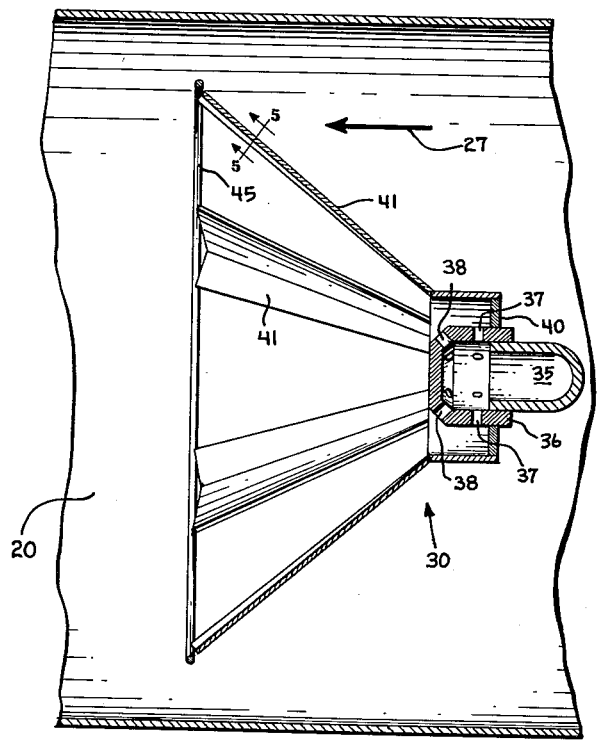
Fig. 3.
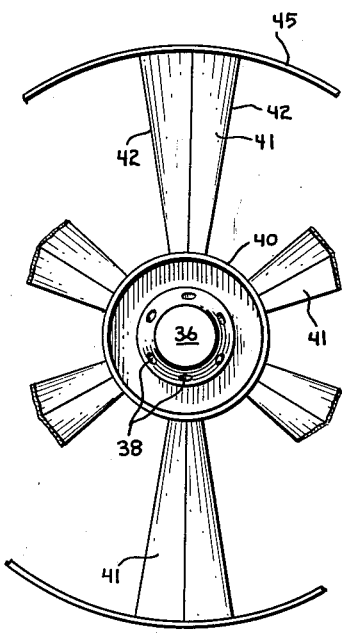
Fig. 4.
Fig. 5.
INVENTOR.
WALTER G. WISE
BY
Lockwood, Woodard, Smith & Weikart
Attorneys United States Patent Office 3,126,198
Patented Mar. 24, 1964

3,126,198
HEATING DEVICE
Walter G. Wise, 230 W. Bakemeyer St., Indianapolis, Ind.
Filed Mar. 3, 1961, Ser. No. 93,156
4 Claims. (Cl. 263—19)

The present invention relates to a heating and/or drying device which finds an important utility about the farm for the purpose of drying grain, hay, tobacco, etc. or any commodity that requires a blast of heated air to effect a drying operation, said device conceivably also being usable to mix one fluid with another even if heating is not accomplished.

As is well known, grain and the like is frequently stored in silos, corn cribs or in similar structures. In order to dry such material and to prevent spoilage thereof, it is necessary to provide a large amount of heated air which is conventionally passed into the lower portion of the structure through the grain and out the top of the structure. Various devices have been conceived for heating a large amount of air and for passing it through such storage containers. These devices, however, either bunch up or concentrate the heat to such an extent that it does not properly spread throughout the moving air or they spread out the heat allowing the flame to be extinguished because of the fact that the large amount of air reduces the temperature at the burner below the combustion point.

Consequently, a primary object of the present invention is to provide an improved heating device capable of uniformly heating a large flow of air which is moving at high velocity.

A further object of the present invention is to provide an improved device for uniformly mixing one fluid with another fluid rapidly flowing in a relatively short conduit.

Still another object is to provide an improved drying device.

Related objects and advantages will become apparent as the description proceeds.

One embodiment of the present invention comprises a conduit, means for moving one fluid along said conduit, an outlet for another fluid positioned centrally of the conduit, and a plurality of vanes extending outwardly of said outlet and downstream of said conduit with relation to said outlet.

The full nature of the invention will be understood from the accompanying drawings and the following description and claims:

FIG. 1 is a perspective view of a grain storage structure equipped with a dryer constructed according to the present invention.

FIG. 2 is an enlarged longitudinal sectional view of the dryer of the present invention.

FIG. 3 is an enlarged section taken along the line 3—3 of FIG. 2 in the direction of the arrows.

FIG. 4 is a side elevation of a portion of the structure illustrated in FIG. 3 taken looking from the left.

FIG. 5 is an enlarged section taken along the line 5—5 of FIG. 3.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a grain storage structure 10 having a floor 11 upon which the grain is supported. The floor is provided with a plurality of openings sufficiently large to allow the passage of air therethrough but sufficiently small to prevent the passage of grain downwardly through the floor. The top 12 of the structure 10 is constructed to permit the flow of air from the grain out of the structure. A foundation 15 supports the floor 11 and provides an open area 16 into which heated air is moved by means of the dryer device 17 which is connected to the dryer by a flaring element 18. It can be appreciated that this heated air passes through the area 16, the floor 11, the grain in the structure and out the top 12.

Referring to FIG. 2, the dryer includes a cylindrical conduit 20 which is relatively short in length to make the dryer as light and compact as possible and to permit the flow of a maximum amount of air through the conduit. A strainer or screen 21 is secured to the entry end of the dryer for safety purposes and to prevent large objects from being sucked into the dryer. A fan or blower 22 including blades 25 and a suitable drive motor 26 is mounted within the conduit adjacent the entry thereof and functions to move a large amount of air in the direction of the arrow 27.

A burner assembly 30 is mounted within the conduit and functions to move gas into the conduit, burn the gas and distribute uniformly the products of combustion throughout the air moving through the conduit. The burner assembly comprises piping 31 which conducts the pure gas into the conduit 20 and specifically to a conventional air-gas venturi arrangement 32. This venturi arrangement which is provided with an adjustable air shutter can be operated to add to the gas anywhere from 30% to 100% of the air needed for combustion thereof. The unburned air-gas mixture (this air being termed primary air) moves from the venturi arrangement 32 through piping 35 into a cup shaped element 36, the piping 35 and venturi arrangement 32 providing the mounting for the cup shaped element 36 which is located at the axis of the cylindrical conduit 20.

The cup shaped element 36 has its open end completely closed by the piping 35 (that is, there is no leakage therebetween) and is provided with outlet ports 37 and 38. Mounted coaxially about and upon the cup shaped element 36 is a burner shield 40 which has its concave side facing downstream of the conduit 20. Secured to the free edge of the shield 40 is a plurality of vanes 41 which extend radially outwardly of the shield and also extend downstream in the conduit, the vanes preferably being arranged at approximately a forty degree angle with the axis of the conduit. For each of the vanes 41, there is provided a port 37 and a port 38 aligned centrally with the particular vane as shown in FIG. 4.

From a study of FIGS. 3 and 4, it can be seen that each of the ports 38 is directed toward the downstream face of its particular vane 41. Thus, the gas-air mixture passing through each port 38 is directed in such a manner that it impinges on the downstream face of a particular one of the vanes. The axis of each of the ports 38 is arranged at approximately forty-five degrees with relation to the axis of the conduit 20 and each of the ports 38 is suitably positioned so that the impingement of the gas-air mixture passing therefrom occurs approximately at five degree angle along the length of the vanes.

Each of the vanes 41 has an obtuse V-shaped cross section (FIG. 5), the legs of which form an obtuse angle of approximately one hundred sixty-five degrees whereby the downstream face of the vane may be termed "recessed" and the upstream surface may be termed "ridged." For the axial flow fan 22 (which is capable of moving the air through conduit 20 at 6,000–7,000 feet per minute), it has been found that this angle is preferable because it permits the flow of the products of combustion a sufficient distance along the vanes so that a portion of such products pass from the ends thereof into the air moving just adjacent the inner surfaces of the conduit. By decreasing the angle of this V-shaped cross section, a greater amount of heat can be transferred to the outer portions of the conduit. This angle should not, however, be increased to a much greater value than one hundred sixty-five degrees because extreme eddying of the air in passing the vanes will result.

As has been suggested above, the combustion of the gas occurs primarily along the length of the vanes 41. During the operation of the present device, these vanes become very hot which effect also facilitates the uniform transmittal of heat into the complete body of air passing through the conduit. Preferably, a spark providing device (not shown) will be mounted in the shield 40 for lighting the burner.

As can be seen from FIG. 4, the sideward edges 42 of the vanes 41 are radial of the conduit which, of course, results in the distal end portions of the vanes being wider than the proximal end portions thereof. A slender ring 45 is suitably fixed by welding or the like to the distal end portions of the vanes in order to provide rigidity to the burner structure. It should be noted that the distal ends of the vanes are spaced from the inner surfaces of the conduit 20 facilitating the mixing of the products of combustion passing from the vanes with the air flowing through the conduit.

From the above description, it can be appreciated that the present invention provides an improved heating and drying device which is capable of uniformly heating a large amount of air even though the device may be constructed very compactly and with great economy of material. The present invention may find usefulness in one or more of the following specific applications: heating spray paint booths, drying and/or heating textiles, heating foundries so that fumes can be removed therefrom by a positive inside pressure, etc. It can also be appreciated that the vane arrangement of the present invention might also be used to distribute other fluids into a large flow of air or fluid. Conceivably, the present device might be used to distribute a coolant into, for example, air flowing through a conduit such as the conduit 20.

It should be noted that the burner assembly 30 causes very little pressure drop in the conduit 20. This desirable feature results from the construction of the burner assembly wherein the area between the vanes is greater than the area blocked by the vanes. In the particular embodiment above described wherein the air flow is approximately 6,000 to 7,000 feet per minute, the pressure drop across the burner assembly is equal to five-eighths inch water head.

As used in the above description and the claims which follow, the term "V-shaped" or "V shape" is intended to mean a shape having a pair of legs at either an obtuse or acute angle to one another.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A heating device comprising a cylindrical conduit, a power operated fan mounted in said conduit for moving air linearly therealong, fuel-air mixture supply duct means mounted centrally of said conduit, a cup-shaped shield for said duct means, said shield fixed coaxially to and surrounding said duct means and having its concavity facing downstream and receiving said duct means, a plurality of vanes secured to the free end of said cup-shaped shield and extending with a radial component and a downstream component relative to said duct means, said duct means being provided with ports the axes of which are directed at the downstream surface of respective ones of said vanes, each of said vanes having a greater lateral dimension at its distal end than at its proximal end, the area between said vanes being greater than the area blocked by said vanes.

2. A heating device comprising a cylindrical conduit, a power operated fan mounted in said conduit for moving air therealong, fuel-air mixture supply duct means mounted centrally of said conduit, a cup-shaped shield for said supply duct means, said shield fixed coaxially to and surrounding said supply duct means and having its concavity facing downstream and receiving said supply duct means, a plurality of vanes secured to the free end of said cup-shaped shield and extending with a radial component and a downstream component relative to said supply duct means, said supply duct means being provided with ports each having an axis directed at the downstream surface of a respective one of said vanes, each of said vanes having a greater lateral dimension at its distal end than at its proximal end, each of said vanes having a V-shaped cross section the obtuse angled surface of which faces downstream, the area between said vanes being greater than the area blocked by said vanes.

3. A heating device comprising a cylindrical conduit, a power operated fan mounted in said conduit for moving air therealong, fuel-air mixture supply duct means mounted centrally of said conduit, a cup-shaped shield for said supply duct means, said shield fixed coaxially to and surrounding said supply duct means and having its concavity facing downstream and receiving said supply duct means, a plurality of vanes secured to the free end of said cup-shaped shield and extending radially therefrom downstream and outwardly of said supply duct means at an angle of approximately forty degrees with the axis of said conduit, said supply duct means being provided with ports the axes of which are arranged at forty-five degrees with relation to the axis of said conduit, each of said ports being directed at the downstream surface of a respective one of said vanes, each of said vanes having a greater lateral dimension at its distal end than at its proximal end, each of said vanes having a V-shaped cross section the obtuse angled surface of which faces downstream, the area between said vanes being greater than the area blocked by said vanes, the distal ends of said vanes defining a circular pattern spaced from said conduit, and a ring arranged coaxially of said conduit, and secured to said distal ends to add rigidity to said vane shield assembly.

4. A heating device comprising a conduit, a power operated blower mounted within said conduit for moving air therealong, fuel-air mixture supply duct means mounted generally coaxially of said conduit, a concave annular shield for said duct means, said shield coaxially engaging and surrounding said duct means and having its concavity facing downstream and receiving said duct means, a plurality of vanes extending from the perimeter of said shield and having a radial component and a downstream component relative to said duct means, said duct means being provided with ports the axes of which are directed at the downstream surface of respective ones of said vanes, each of said vanes having a greater lateral dimension at its distal end than at its proximal end, the area between said vanes being greater than the area blocked by said vanes.

References Cited in the file of this patent

UNITED STATES PATENTS

| | | | |
|---|---|---|---|
| 1,691,607 | Kerr | Nov. 13, | 1928 |
| 1,699,032 | Shuell et al. | Jan 15, | 1929 |
| 2,227,666 | Noack | Jan. 7, | 1941 |
| 2,715,813 | Holmes et al. | Aug. 23, | 1955 |
| 2,775,867 | Collins | Jan. 1, | 1957 |
| 2,780,916 | Collins | Feb. 12, | 1957 |
| 2,840,152 | Reed | June 24, | 1958 |
| 2,866,627 | Sherman | Dec. 30, | 1958 |
| 2,896,933 | Barnes | July 28, | 1959 |
| 2,927,423 | Wisniowski | Mar. 8, | 1960 |
| 3,009,317 | Meyer et al. | Nov. 21, | 1961 |
| 3,024,608 | Carlotti | Mar. 13, | 1962 |
| 3,051,464 | Yeo et al. | Aug. 28, | 1962 |